C. W. FOSDICK.
SAW BRAZING APPARATUS.
APPLICATION FILED JULY 28, 1913.
1,098,715.
Patented June 2, 1914.
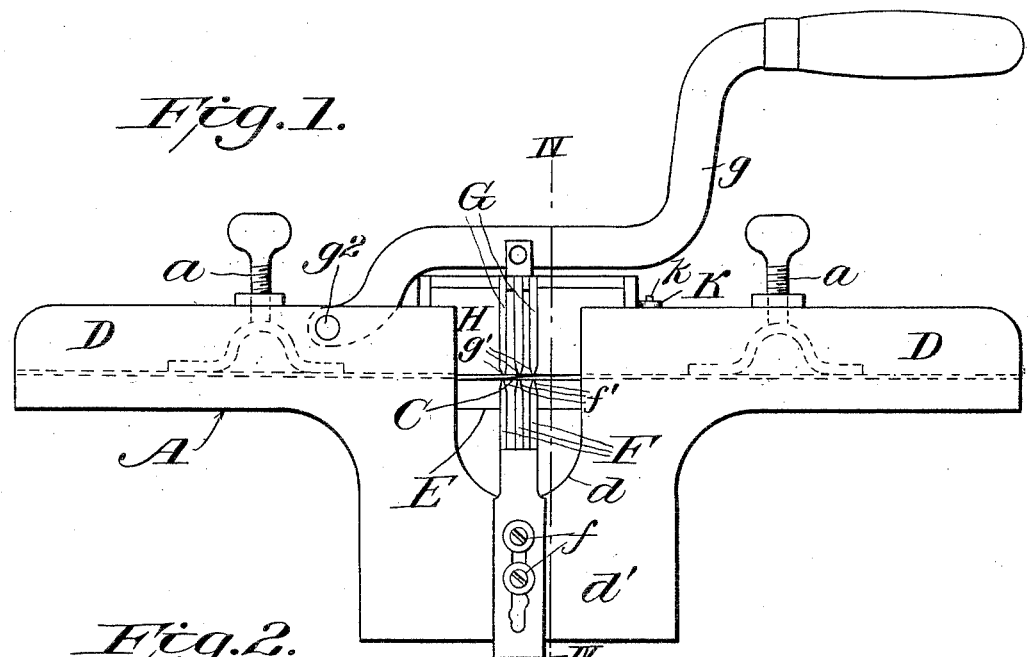
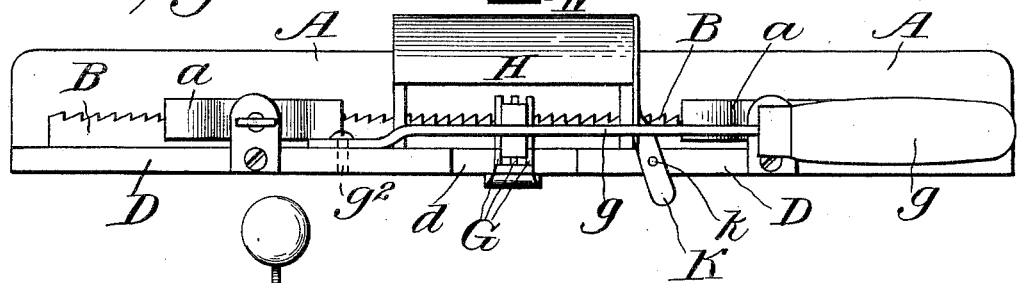
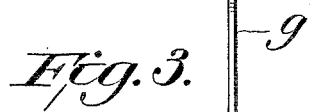
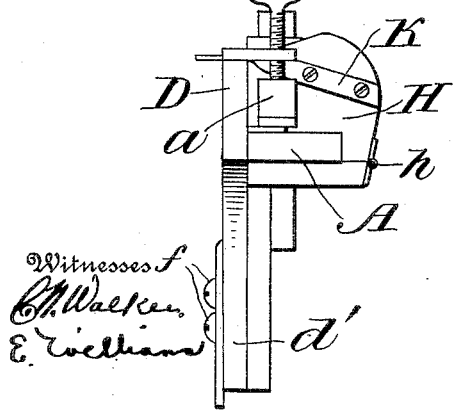
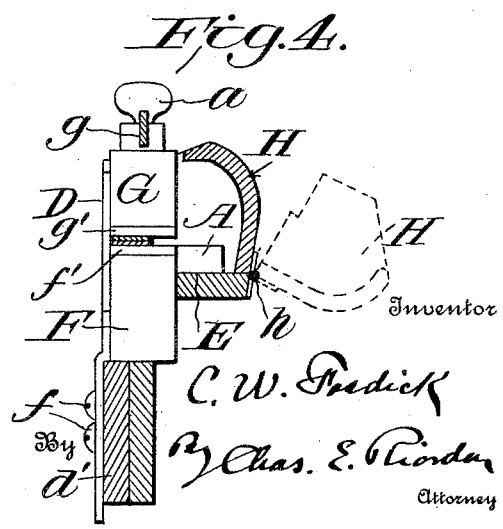

UNITED STATES PATENT OFFICE.

CLARENCE W. FOSDICK, OF ALHAMBRA, CALIFORNIA.

SAW-BRAZING APPARATUS.

1,098,715.  Specification of Letters Patent.  Patented June 2, 1914.

Application filed July 28, 1913. Serial No. 781,683.

*To all whom it may concern:*

Be it known that I, CLARENCE W. FOSDICK, a citizen of the United States, residing at Alhambra, in the county of Los Angeles and State of California, have invented certain new and useful Improvements in Saw-Brazing Apparatus, of which the following is a full, clear, and exact specification.

This invention relates to brazing appliances and is especially designed for brazing pieces of band-saws.

The principal object of this invention is to generally improve upon the prior devices of this kind. To this end I provide a hood for concentrating the heat of the flame around the joint, which hood is adapted to remain in position to house the joint during the clamping or pressing operation. I also provide the clamping jaws with spaced transversely arranged fingers having their ends, which come in contact with the saws, made very thin, preferably beveled to rather sharp edges, so as to reduce to a minimum the extent of the surfaces of the overlapping parts of the saw covered by the contacting portions of the jaws, substantially the entire areas of both upper and lower surfaces of said overlapping parts being thus exposed to the direct action of the flame while the clamping jaws are in contact therewith.

Other objects are to generally improve and simplify the construction of the appliance, render it easy in operation, and provide for adjustment of the fixed clamping jaws to take up wear.

The invention will be first hereinafter described in connection with the accompanying drawings, which constitute a part of this specification and then more specifically set forth in the claim at the end of the description.

In the accompanying drawings in which similar reference characters are used to indicate corresponding parts throughout the several views: Figure 1 is a front elevation of a brazing appliance constructed in accordance with the present invention, two pieces of band saws being shown in position to be brazed and the clamping jaws being in contact with the overlapping parts of said saws; Fig. 2 is a plan view of the same; Fig. 3 is an end elevation, and Fig. 4 is a cross section taken on the line IV—IV of Fig. 1, the open position of the hood being indicated in dotted lines.

Referring more particularly to the drawings A designates a table or support upon which pieces of band saws B are held by clamps $a$ while the joint C is being brazed or soldered. The table may be of any suitable or desired dimensions, and is provided with a vertical flange D at its front edge against which the saws may be alined. The middle portion of the table A is depressed, at E and an opening $d$, preferably U-shaped, is formed in the flange D opposite said depression, said flange having a downwardly extended portion $d'$ at its center to which the fixed clamping jaw F is adjustably secured as at $f$. As shown said fixed clamping jaw F comprises a plurality of spaced fingers, each extending across the saw joint and each having its contacting end sharpened to a line or point, as at $f'$. The movable clamping jaw G is of similar form its fingers having beveled or sharpened ends $g'$ arranged in vertical alinement with the beveled ends of the fixed jaw fingers when in clamping position. Said movable clamping jaw is carried by a hand lever $g$ pivoted to the flange D at $g^2$.

The overlapping parts or joint of the saws, and the clamping jaws are housed at the rear and at both sides by a hood H hinged at $h$ at the rear edge of the table A and detachably secured in operative position by a spring catch K attached to one end of the hood and adapted to engage a pin $k$ on the upper edge of the flange D. Being entirely independent of the movements of the hand lever $g$ which carries the movable clamping jaw, the hood may remain in closed or operative position during the operation of said jaw as well as during the application of the flame. The hood is hinged so that it can be turned back as shown in dotted lines in Fig. 4, to facilitate the removal of the saw after the joint has been formed.

In operation, the pieces of saws to be united by brazing or soldering are secured in position on the table and the brazing compound or solder applied to the joint before the movable clamping jaw G is lowered to the position illustrated. The flame (not shown) may also be applied through the U-shaped opening $d$ in the flange D to soften the brazing compound or solder before said clamping jaw G is lowered into operative position. After said jaw is lowered and pressed into contact with the joint, the flame may play in between the fingers of said jaw, as well as the fingers of the fixed clamping jaw F, and thus easily reach substantially the entire upper and lower surfaces of the joint. The movable clamping jaw is held down for a short time after the flame is removed in order to keep the overlapping parts of the saws pressed together until the brazing compound or solder hardens. As already explained the hood may remain in operative position housing the joint and the clamping jaws during the whole brazing operation including the pressing of the joint between said jaws, whereby the full benefit of the concentrated heat of the flame is obtained.

It will be observed that the clamping of the joint between the upper and lower jaws or fingers produces a smooth joint which could not otherwise be obtained because the heat from the flame would otherwise cause the saw to expand and buckle. The lower jaw or fingers being arranged on a level with the table, this buckling is overcome by the pressure exerted upon the joint through the upper jaw or fingers. If this buckle is not removed during the brazing process, it is practically impossible to eliminate it and when present it causes the saw to jump and click in use.

Having thus described my invention, what I claim as new and desire to secure by Letters Patent of the United States is:

The combination, with means for holding parts to be united by brazing, of clamping jaws adapted to press the joint between them, said jaws comprising spaced fingers, adapted to register with each other when engaged with the joint, each of said fingers being disposed transversely of the parts to be united and extending substantially the full width of said parts, and the fingers of each jaw covering at intervals substantially the entire overlap at the joint, the ends of said fingers which contact with the joint being sharpened, whereby the flame may play between said fingers and reach substantially the entire surface of the joint.

In testimony whereof I have signed my name to this specification in the presence of two attesting witnesses.

CLARENCE W. FOSDICK.

Witnesses:
N. H. HAMMOND,
WM. K. CARR.

---

Copies of this patent may be obtained for five cents each, by addressing the "Commissioner of Patents, Washington, D. C."